United States Patent

[11] 3,633,350

[72] Inventor   Gunter Schumacher
                Haus Nr. 51, 5231 Eichelhardt, Germany
[21] Appl. No.  59,441
[22] Filed      July 30, 1970
[45] Patented   Jan. 11, 1972
[32] Priority   Aug. 4, 1969
[33]            Germany
[31]            P 19 39 650.0

[54] GRAIN LIFTER ADJUSTING DEVICES
     9 Claims, 3 Drawing Figs.
[52] U.S. Cl. .................................................... 56/313
[51] Int. Cl. .................................................... A01d 55/13
[50] Field of Search .......................................... 56/312,
                                                    313, 314, 318, 319, 320

[56]            References Cited
                UNITED STATES PATENTS
737,028   8/1903   Seidl ........................... 56/313

| 1,258,740 | 3/1918 | Blocki .......................... | 56/313 |
| 1,818,335 | 8/1931 | Kenison ......................... | 56/312 |
| 2,892,298 | 6/1959 | Chaney .......................... | 56/314 |
| 3,313,095 | 4/1967 | Gaterman ........................ | 56/312 |

*Primary Examiner*—Russell R. Kinsey
*Attorney*—Steinberg & Blake

ABSTRACT: A grain-cutting assembly having a grain lifter provided with the possibility of adjustment thereof. A holder has a finger engaging and extending forwardly therefrom with a bolt extending forwardly therefrom with a bolt extending through the holder and finger and carrying a nut for fixing the finger to the holder. An elongated springy arm of a grain lifter is supported by the finger for limited movement with respect thereto and has a rear end at the region of the bolt. An adjusting structure is provided for selectively adjusting the elevation of the rear end of the arm at the bolt, so that the pointed front end of the grain lifter can in this way have its elevation adjusted.

3,633,350

PATENTED JAN 11 1972

INVENTOR.
GUNTER SCHUMACHER
BY Steinberg & Blake
Attorneys

GRAIN LIFTER ADJUSTING DEVICES

BACKGROUND OF THE INVENTION

The present invention relates to grain-cutting machines.

Such machines may take the form, for example, of a tractor attachment or they may form part of a harvester thresher and grain binder.

The present invention relates particularly to a grain lifter which is used with assemblies of this latter type. Such grain lifters serve to raise from the ground grain which otherwise would not be properly cut. The grain is conventionally guided between fingers which are moved forwardly during movement of the grain-cutting device so as to reach the cutters which are situated in the vicinity of the rear ends of these fingers. Grain which happens to be lying directly on the ground, however, will not be properly guided between the fingers to the cutters so that such grain is not properly treated and instead the grain becomes easily separated from the stalk and is lost under such conditions. However, when a grain lifter is used those grain ears which happen to be down on the ground for any reason are lifted so as to be properly handled by the cutting assembly. Thus, such grain lifters serve to raise from the ground grain which no longer stands at the stalk and instead has for some reason become lowered and lies on the ground.

Such grain lifters conventionally are of a pointed configuration and have a relatively flat supporting arm which is to be fastened to one of the fingers so as to extend forwardly therefrom and slide along the ground. This supporting arm is fixed at its front end to an upwardly and rearwardly inclined lifting arm which forms with the supporting arm the pointed tip at the front end of the lifter. This lifting arm generally is of a tubular structure having either an oval or circular cross section and serves to raise the grain which happens to be lying on the ground.

During actual use of structures of this type, experience has shown that particularly when operating on a relatively uneven field or when harvesting fallen crops, it is highly desirable to be able to adjust the elevation of the pointed tip of the grain lifter with respect to the cutting mechanism, and it is particularly desirable to be able to raise this pointed front tip of the grain lifter so that in this way it is possible to avoid engagement of the pointed tip with irregularities of the ground.

Such adjustments are not possible with presently known grain lifters. Thus, with conventional structures it is required to replace an entire set of fingers and grain lifters with another set of a different structure in order to adapt the device to use under different operating conditions. Thus one set of grain lifters having supporting arms of one configuration must be replaced by an entirely new set having supporting arms of a different configuration. This requirement has proved in practice to be far too expensive so that as a practical matter such devices are not used.

SUMMARY OF THE INVENTION

It is accordingly a primary object of the present invention to provide a simple structure for adapting the grain lifters to the particular operating conditions, which is to say to the particular type of terrain on which the operations are carried out and with respect to the condition of the crops, so as to achieve the best possible operations with an inexpensive structure which is simple to adjust.

Thus, it is a particular object of the present invention to provide a structure of the above type with a simple means which can be readily adjusted to provide a selected elevation for the pointed tip of the grain lifter.

A further object of the invention is to provide a construction where the adjusting means is situated at a location which will bring about a substantial degree of adjustment of the tip of the grain lifter in response to a relatively small adjusting movement at the adjusting means itself.

It is also an object of the present invention to provide a construction which will reliably maintain the grain lifter in its adjusted position.

According to the invention the grain-cutting assembly has a holder and a finger engaging and extending forwardly therefrom, with a fastening bolt extending through the holder and finger and carrying a nut which is threaded on the bolt to fix the finger to the holder. A grain lifter has an elongated springy supporting arm which by a support means is mounted on the finger for movement with respect thereto while being carried thereby. This arm of the grain lifter has a rear end situated at the region of the bolt. At the bolt there is an adjusting means of the invention coacting with the rear end of the arm for adjusting the elevation of the rear end thereof along the bolt.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
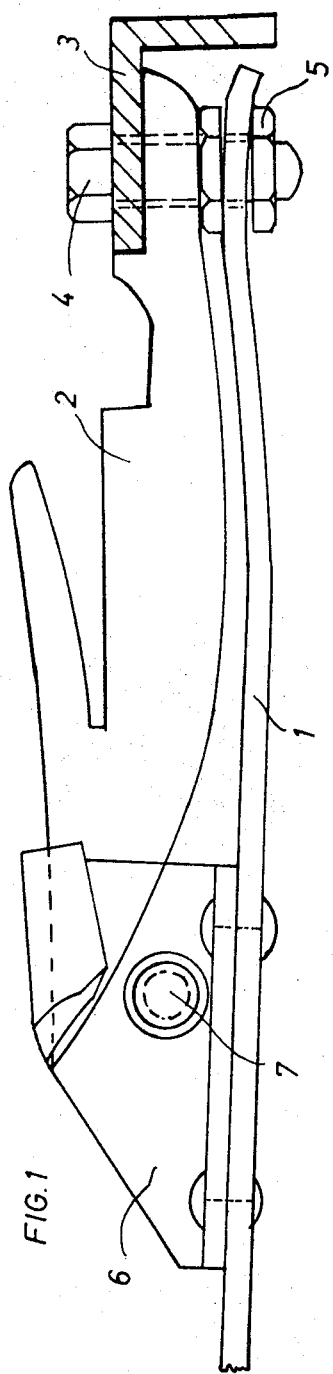
FIG. 1 is a partly sectional and partly fragmentary side elevation of a construction to which the present invention is applied.

Referring now to FIG. 1, there is fragmentarily illustrated therein only an elongated springy arm 1, forming a supporting arm for a grain lifter. At its left end which is not visible in FIG. 1, the grain lifter has as is shown in U.S. Pat. No. 3,579,967, a pointed configuration formed by an upwardly and rearwardly extending inclined lifting arm which is fixed at its bottom end to the front end of the arm 1. The rear end of the arm 1 is visible at the right of FIG. 1. The forward pointed tip of the grain lifter is omitted from the drawings for the sake of clarity, so that the remaining structure can be illustrated at a larger scale.

The illustrated structure includes for the grain-cutting machine a holder 3 in the form of an elongated angle bar and a plurality of fingers 2 one of which is visible in FIG. 1. A series of these fingers are situated in side-by-side relation so that grain or stalks can move between these fingers as is well known. Each finger 2 is fixed with the holder 3 by way of a bolt 4 extending downwardly through aligned openings of the holder 3 and finger 2. The threaded shank of the bolt 4 carries a nut 5 which serves with the bolt 4 to fix the finger 2 to the holder 3. The nut 5 is formed with an annular groove at its exterior. The elongated springy supporting arm 1 of the grain lifter is formed at its rear end with a notch, and this notch receives the part of the nut 5 which defines the base of the groove thereof with the rear end of the arm 1 being received in the groove of the nut 5.

A support means 6 is provided for supporting the grain lifter on the free or outer end of the finger 2. This support means takes the form of an angled plate which is riveted to the springy arm 1 and which has an upper curved part forming a hook which extends around and rests on the upper surface of the finger 2. An elongated member 7 extends from the vertical wall of the support means 6 and is situated beneath and spaced from the front end of the finger 2 when the upper hooked or curved portion of the support means 6 rests on the top surface of the finger 2, so that this element 7 forms a limiting means for limiting the extent of up and down movement of the arm 1 with respect to the finger 2. This element 7 forms a security device reliably preventing accidental removal of the grain lifter from the finger 2 while providing a limited degree of free movement of the grain lifter with respect to the finger 2 on which it is supported by the support means 6.

Figure 2:
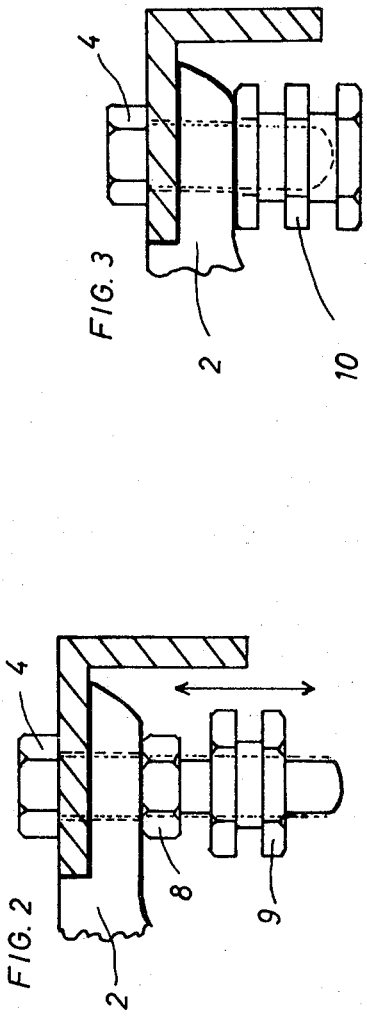
FIG. 2 is a partly sectional and fragmentary elevation illustrating one embodiment of a structure according to the invention.

With the embodiment of the invention which is illustrated in FIG. 2 the grain lifter itself is omitted for the sake of clarity. The finger 2 is held assembled with the holder by way of a special nut 8 which coacts with the bolt 4. With this embodiment of the invention there is an adjusting means in the form of an additional nut 9 which is formed with the annular groove to receive the notched rear end of the springy supporting arm 1 of the grain lifter. This nut 9 can be adjusted along the threaded shank of the bolt 4, as indicated by the double-headed arrow in FIG. 2, so that the notched rear end of the arm 1 which is received in the annular groove of the nut 9, in precisely the same way as described above in connection with the nut 5 of FIG. 1, can have its elevation adjusted. The arm 1 is supported on the finger 2 by the support means 6 in the manner described above, and the front tip of the grain lifter is situated at a considerable distance beyond the support means 6, this latter distance being several times the distance between the support means 6 and the nut 5, so that in response to a relatively slight up and down movement of the nut 9 which forms the adjusting means of FIG. 2 it is possible to provide a substantial change in the elevation of the front tip of the grain lifter. In this way the nut 9 of FIG. 2 forms an adjusting means for adjusting the elevation of the grain lifter, particularly at its front pointed end.

Instead of an arrangement as shown in FIG. 2 where a single nut 9 forms the adjusting means, it is possible to provide a plurality of nuts on the threaded shank of the bolt 4, situating these nuts one next to the other with each of the nuts having an annular groove, so that these grooves are situated at different elevations for selectively receiving the notched rear end of the arm 1, and in this way also it is possible to provide the tip of the grain lifter with a selected elevation. Thus the adjusting means of the invention may also take the form of a plurality of nuts on the bolt 4 respectively formed with the annular grooves for respectively receiving the notched rear end of the arm 1.

Figure 3:
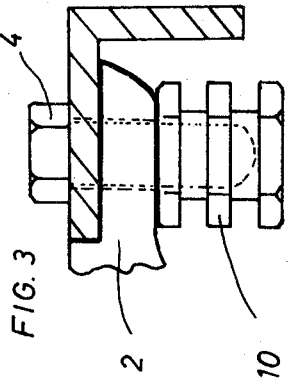
FIG. 3 is a partly sectional and fragmentary elevation illustrating another embodiment of a structure according to the present invention.

With the embodiment of this invention which is illustrated in FIG. 3, the finger 2 is also fixed to the transverse holder by way of a bolt and nut assembly which includes the bolt 4. However in this case the nut 10, which with the bolt 4 serves to fix the finger 2 to the holder, forms itself, at its outer portion, the adjusting means of this embodiment. Thus it is the outer portion of the nut 10 which is formed with a plurality of annular grooves distributed axially along the axis of the bolt 4, so that anyone of these grooves can selectively receive the notched rear end of the arm 1 in the manner described above. In the illustrated example the nut 10 has a pair of annular grooves either one of which may receive the notched rear end of the arm 1. Thus with this embodiment it is possible to adjust the elevation of the front tip of the grain lifter between a pair of different elevations. The greater the distance of the notched rear end of the arm 1 from the rear end of the finger 2, the greater the extent to which the front tip of the grain lifter is raised.

As is apparent from FIG. 3, the nut 10 extends through a substantial distance beyond the threaded shank of the bolt 4. In this way the bolt 4 will be prevented from contacting the ground and foreign bodies thereon. The bottom interior of the nut 10 can be provided with a plug for closing off the interior of the nut 10 from the outside ground area to prevent also foreign particles from having access to the threaded shank 4 through the interior of the nut 10.

Experience has shown that with the structure of the invention a relatively small extent of movement of the rear end of the arm 1 by the adjusting means of the invention will result in a substantial movement of the front pointed tip of the grain lifter, this latter substantial movement being on the order of several centimeters.

Because the arm 1 of the grain lifter is springy and is introduced into the groove of the nut in a stressed condition, the nut will be reliably held in its adjusted position, with the embodiment of FIG. 2, for example, as a result of the spring force of the arm 1 tending to displace the nut axially along the shank 4. In this way the springy arm 1 serves to lock the nut in its adjusted position. However, by giving the nut a polygonal configuration, such as that of a square or hexagon, at its part which is surrounded by the groove and situated within the notch of the arm 1, a positive prevention of rotation of the nut from its adjusted position is assured. However, in this case the arm 1 will be displaced out of the nut when the latter is adjusted and then will be assembled with the nut after the adjusted position of the nut is reached.

With the structure as described above it is possible to achieve very quickly a continuous change in the elevation of the tip of the grain lifter through a range of approximately 5–6 centimeters.

Of course, with an embodiment as shown in FIG. 3 a continuous adjustment is not possible, but experience has shown that two or three different elevations for the tip are sufficient, so that an arrangement as shown in FIG. 3 is fully adequate for many purposes. Therefore with an embodiment as shown in FIG. 3 it is unnecessary to turn the nut along the shank of the screw in order to achieve the desired adjustment.

Since the adjusting means is formed by the outer portion of the nut 10 of FIG. 3, this nut 10 serves not only as the adjusting means but also as the means for fixing the finger 2 and the holder 3 to each other. Moreover with the embodiment of FIG. 3 the use of relatively long bolts 4 is not required. It is only required that the shank of the bolt 4 extend partly into the interior of the nut 10.

Thus, the springy nature of the arm 1 will itself act to maintain the nut in its adjusted position, but an additional security is achieved by utilizing a nut where a square or hexagonal configuration is provided for the part thereof which is surrounded by the groove. Naturally the width of the notch at the rear end of the arm 1 is only slightly greater than the transverse dimension of the part of the nut which is surrounded by the groove so that while the fingers at the rear end of the arm between which the notch thereof is formed can be easily slipped into the groove of the nut, nevertheless rotary movement of the nut with respect to the arm 1 will be reliably prevented.

It is apparent from the above description that with the invention there is provided an exceedingly simple and inexpensive structure for achieving in a highly convenient rapid manner an adjustment of the front tip of the grain lifter.

What is claimed is:

1. In a grain-cutting assembly, a holder, a finger engaging said holder and extending therefrom, a fastening bolt extending through said holder and finger, a nut threaded on said bolt and engaging said finger for coacting with said bolt to fix said finger to said holder, a grain lifter having an elongated springy supporting arm provided with a rear end which is situated adjacent said bolt, support means connected to said grain lifter and coacting with said finger for supporting said grain lifter on said finger with the possibility of moving with respect to said finger, and adjusting means coacting with said rear end of said arm of said grain lifter for adjusting the elevation of the rear end of said arm at the region of said bolt, to adjust the elevation of a front end of said grain lifter.

2. The combination of claim 1 and wherein said adjusting means includes a second nut threaded on said bolt beneath said first-named nut, said second nut being formed with an exterior annular groove and said rear end of said arm being formed with a notch receiving that part of said second nut which is surrounded by said groove thereof with said rear end of said arm received in said groove so that said second nut can be turned to be located at a selected elevation along said bolt for determining the position of said rear end of said arm of said grain lifter.

3. The combination of claim 2 and wherein said nut has an exterior polygonal configuration at the interior of said groove at its portion which is surrounded by said groove, to contribute to prevention of rotary movement of said second nut when said rear end of said arm is situated therein.

4. The combination of claim 1 and wherein said adjusting means includes a plurality of nuts, in addition to said first-named nut, threaded on said bolt and each formed with an annular groove for selectively receiving the rear end of said arm, said rear end of said arm being formed with a notch and extending into a groove of a selected one of said plurality of nuts of said adjusting means.

5. The combination of claim 4 and wherein each of said plurality of nuts has a polygonal cross section at its portion which is surrounded by said groove to contribute to prevention of rotary movement of each nut with respect to said arm.

6. The combination of claim 1 and wherein said adjusting means includes an outer portion of said nut formed with a plurality of annular grooves distributed axially along said nut for selectively receiving the rear end of said arm, said rear end being formed with a notch and extending into a selected one of said grooves of said nut.

7. The combination of claim 6 and wherein said bolt has an elongated shank portion extending beyond said finger and receiving said nut, and said nut extending axially beyond said elongated shank portion of said bolt.

8. The combination of claim 7 and wherein said nut has at its portion which is situated beyond said shank portion of said bolt a plug closing the interior of said nut at its portion which is situated beyond said shank portion of said bolt.

9. The combination of claim 6 and wherein said nut has a polygonal configuration at each part thereof which is surrounded by a groove, for coacting with said rear end of said arm to contribute to prevention of rotary movement of said nut on said bolt.

* * * * *